(12) United States Patent
Serban et al.

(10) Patent No.: US 8,608,951 B2
(45) Date of Patent: *Dec. 17, 2013

(54) PROCESS FOR REMOVING METALS FROM CRUDE OIL

(75) Inventors: Manuela Serban, Glenview, IL (US); Alakananda Bhattacharyya, Glen Ellyn, IL (US); Beckay J. Mezza, Arlington Heights, IL (US); Kurt M. Vanden Bussche, Lake in the Hills, IL (US); Christopher P. Nicholas, Evanston, IL (US); Warren K. Bennion, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 447 days.

This patent is subject to a terminal disclaimer.

(21) Appl. No.: 12/945,807

(22) Filed: Nov. 12, 2010

(65) Prior Publication Data

US 2011/0155645 A1 Jun. 30, 2011

Related U.S. Application Data

(60) Provisional application No. 61/291,298, filed on Dec. 30, 2009.

(51) Int. Cl.
| | | |
|---|---|---|
| C10G 21/06 | (2006.01) | |
| C10G 21/20 | (2006.01) | |
| C10G 21/24 | (2006.01) | |
| C10G 21/28 | (2006.01) | |
| C10G 29/20 | (2006.01) | |
| C10G 67/04 | (2006.01) | |

(52) U.S. Cl.
USPC ..................................... 208/251 R

(58) Field of Classification Search
CPC ........ C10G 21/06; C10G 21/08; C10G 21/12; C10G 21/16; C10G 21/18; C10G 21/20; C10G 21/22; C10G 21/24; C10G 21/28

USPC .......... 208/87, 89, 96, 187, 188, 208 R, 211, 208/236, 237, 238, 251 R, 254 R, 262.1, 208/265, 289, 292, 298, 311; 585/860, 864, 585/865, 867

See application file for complete search history.

(56) References Cited

U.S. PATENT DOCUMENTS

| | | | |
|---|---|---|---|
| 2,981,678 A | | 4/1961 | Buningh |
| 3,652,735 A | * | 3/1972 | Hechenbleikner et al. ... 558/215 |

(Continued)

FOREIGN PATENT DOCUMENTS

| | | | | |
|---|---|---|---|---|
| CN | 1657596 A | * | 8/2005 | ............. C10G 33/02 |
| CN | 1847366 A | * | 10/2006 | ............. C10G 29/20 |

(Continued)

OTHER PUBLICATIONS

Sandra T. M. Vidal, M. Joana Neiva Correia, M. Matilde Marques, M. Rosinda Ismael & M. Teresa Angelino Reis, Studies on the Use of Ionic Liquids as Potential Extractants of Phenolic Compounds and Metal Ions, Jul. 2004, Separation Science and Technology, vol. 39, Issue 9, pp. 2155-2169.*

(Continued)

*Primary Examiner* — Nina Bhat
*Assistant Examiner* — Jonathan Miller
(74) *Attorney, Agent, or Firm* — Mark Goldberg

(57) ABSTRACT

A process for removing a metal from a crude oil includes contacting the crude oil containing the metal with a crude-immiscible ionic liquid to produce a crude oil and crude-immiscible ionic liquid mixture, and separating the mixture to produce a crude oil effluent having a reduced metal content relative to the crude oil feed. Optionally, a de-emulsifier is added to at least one of the contacting and separating steps.

5 Claims, 2 Drawing Sheets

(56) References Cited

U.S. PATENT DOCUMENTS

| | | | |
|---|---|---|---|
| 4,376,040 A * | 3/1983 | Sader | 208/180 |
| 4,483,763 A | 11/1984 | Kuk | |
| 4,747,936 A | 5/1988 | Penning | |
| 4,992,210 A | 2/1991 | Naeger | |
| 5,494,572 A * | 2/1996 | Horii et al. | 208/263 |
| 5,817,228 A | 10/1998 | Greaney et al. | |
| 5,961,821 A | 10/1999 | Varadaraj et al. | |
| 6,013,176 A * | 1/2000 | Greaney et al. | 208/251 R |
| 6,096,196 A | 8/2000 | Varadaraj et al. | |
| 6,139,723 A | 10/2000 | Pelrine | |
| 6,464,859 B1 | 10/2002 | Duncum et al. | |
| 6,596,914 B2 | 7/2003 | Gore | |
| 6,881,325 B2 | 4/2005 | Morris | |
| 7,001,504 B2 | 2/2006 | Schoonover | |
| 7,019,188 B2 * | 3/2006 | Smith et al. | 585/809 |
| 7,198,712 B2 | 4/2007 | Olivier-Bourbigou | |
| 7,252,756 B2 | 8/2007 | Gong | |
| 7,553,406 B2 | 6/2009 | Wasserscheid | |
| 7,749,377 B2 | 7/2010 | Serban | |
| 7,914,688 B2 | 3/2011 | Anderson et al. | |
| 8,343,336 B2 * | 1/2013 | Hamad et al. | 208/237 |
| 2007/0000809 A1 | 1/2007 | Lin | |
| 2008/0221353 A1 * | 9/2008 | Tsunashima | 564/12 |
| 2008/0245705 A1 | 10/2008 | Siskin | |
| 2009/0101592 A1 | 4/2009 | Anderson et al. | |
| 2009/0288992 A1 * | 11/2009 | Likhanova et al. | 208/237 |
| 2010/0051509 A1 * | 3/2010 | Martinez et al. | 208/237 |
| 2010/0243532 A1 | 9/2010 | Myers | |
| 2010/0270211 A1 * | 10/2010 | Wolny | 208/243 |
| 2011/0203972 A1 * | 8/2011 | Gargano et al. | 208/236 |

FOREIGN PATENT DOCUMENTS

| | | | | |
|---|---|---|---|---|
| EP | 1854786 A1 * | 11/2007 | | C07D 213/84 |
| JP | 11241074 A | 9/1999 | | |
| WO | WO 2007138307 A2 * | 12/2007 | | C10F 21/27 |

OTHER PUBLICATIONS

Yi Nie, Chun-Xi Li, Zi-Hao Wang, Extractive Desulfurization of Fuel Oil Using Alkylimidazole and Its Mixture with Dialkylphosphate Ionic Liquids, Jul. 18, 2007, Ind. Eng. Chem. Res., vol. 46, No. 15, pp. 5108-5112.*

U.S. Appl. No. 12/945,253, filed Nov. 12, 2010, Serban et al.
U.S. Appl. No. 12/945,303, filed Nov. 12, 2010, Bhattacharyya et al.
U.S. Appl. No. 12/945,752, filed Nov. 12, 2010, Bhattacharyya et al.
U.S. Appl. No. 12/945,765 filed Nov. 12, 2010, Serban et al.
U.S. Appl. No. 12/945,786, filed Nov. 12, 2010, Serban et al.
Xie, Selective Extraction and Identification of Neutral Nitrogen Compounds Contained in Straight-Run Diesel Feed Using Chloride Based Ionic Liquid, Industrial and Engineering Chemistry Research 47(22) 2008, pp. 8801-8807, 2008 American Chemical Society.
Peng, Extraction of Basic Nitrides from FCC Diesel Using Ionic Liquids at Room Temperature, Petroleum Science and Technology 23:9, 2005, pp. 1023-1031, Publisher: Taylor and Francis.
Fan, Review of Researches and Application of Room Temperature Ionic Liquids in Petroleum Industry,Oilfield Chemistry 24(3) 2007, pp. 283-286, China International Book Trading Corp. (abstract in English).
Eber, Deep Desulfurization of Oil Refinery Streams by Extraction with Ionic Liquids, GreenChem., 2004, 6, pp. 316-322, The Royal Society of Chemistry 2004.
Wei, Room Temperature Ionic Liquid as a Novel Medium for Liquid/Liquid Extraction of Metal Ions, Analytica Chimica Acta 488 (2003) pp. 183-192, Elsevier.
Visser, Liquid/Liquid Extraction of Metal Ions in Room Temperature Ionic Liquids, Separation Science and Technology 36(5&6), (2001) Marcel Dekker Inc., pp. 785-804.

* cited by examiner

PROCESS FOR REMOVING METALS FROM CRUDE OIL

CROSS-REFERENCE TO RELATED APPLICATION

This application claims the benefit of priority to U.S. Provisional Application No. 61/291,298 which was filed on Dec. 30, 2009.

FIELD OF THE INVENTION

The present invention relates to processes for removing one or more metals from crude oil. More particularly, the invention relates to such processes using an ionic liquid.

BACKGROUND OF THE INVENTION

Crude oil is known to contain a variety of metals, such as, alkali, alkaline earth metals, first transition metals, as well as Al, Sn, Pb, Sb, and the like. The presence of metals in crude oil during subsequent processing may cause corrosion, environmental pollution, and may poison the catalysts used. The metals may also interfere in oil refining processes by causing excessive coke formation.

Crude oil is conventionally fractionated in a crude distillation zone to produce several hydrocarbon fractions, such as naphtha, diesel, vacuum gas oil, and resid. The metals in the crude tend to concentrate in the heavier hydrocarbon fractions, and these heavier fractions including resid and gas oils are normally treated to reduce the metal content. For example, metals may be further concentrated in heavy bottoms or coke product in thermal processes such as coking and visbreaking. Metals may also be removed by adsorption onto solid particles such as catalysts or adsorbents. Such particles may be used in conjunction with hydrotreating processes that also reduce the nitrogen and sulfur content of the heavier hydrocarbon fractions.

PCT application PCT/GB2007/001985 published as WO 2007/138307 A2 discloses a sulfur-containing acid removal process for deacidifying a crude oil and/or crude oil distillate containing sulfur-containing acids comprising the steps of: (a) contacting the crude oil and/or crude oil distillate containing sulfur-containing acids with a basic ionic liquid having a melting point of below 150° C., and extracting at least a portion of the sulfur-containing acids into the basic ionic liquid as an extract phase; and (b) separating a crude oil and/or crude oil distillate phase which is reduced in acidity from the basic ionic liquid phase.

Liquid/Liquid Extraction of Metal Ions in Room Temperature Ionic Liquids, by Visser, Ann E., et al, Separation Science and Technology, 36(5&6), 785-804, (2001), Marcel Dekker, Inc., discloses the use of room temperature ionic liquids, specifically, 1-alkyl-3-methylimidazolium hexafluorophosphate, to separate metal ions from aqueous solutions.

U.S. Pat. No. 4,992,210 discloses a composition and method for improving the removal of corrosive contaminants from crude oil within the desalter in a petroleum refinery. An amine is added to the wash water or to the crude oil prior to processing in the desalter. The amine maximizes the yield of wash water removed from the desalter and substantially improves the removal of metal generating corrosive elements. The addition of the amine upstream of the desalter results in the removal of a significant amount of corrosive chlorides from the crude oil before it is passed through the fractionating unit and other refinery operations. The avoidance of adding metals and the assistance in removing other metals from the crude system aids in the reduction or elimination of downstream fouling and petroleum catalyst poisoning.

There remains a need in the art for improved processes that reduce the metal content of crude oil.

SUMMARY OF THE INVENTION

In an embodiment, the invention is a process for removing a metal from a crude oil comprising: contacting the crude oil comprising the metal with a crude-immiscible ionic liquid comprising at least one of an imidazolium ionic liquid, an ammonium ionic liquid, a pyridinium ionic liquid, and a phosphonium ionic liquid to produce a mixture comprising the crude oil and the crude-immiscible ionic liquid; separating the mixture to produce a crude oil effluent and a crude-immiscible ionic liquid effluent comprising the metal; and optionally adding a de-emulsifier to at least one of the contacting step and the separating step.

In another embodiment, the crude-immiscible ionic liquid comprises at least one of 1-ethyl-3-methylimidazolium ethyl sulfate, 1-butyl-3-methylimidazolium hydrogen sulfate, 1-ethyl-3-methylimidazolium chloride, 1-ethyl-3-methylimidazolium bis(trifluoromethylsulfonyl)imide, 1-butyl-3-methylimidazolium hexafluorophosphate, 1-butyl-3-methylimidazolium tetrafluoroborate, tetraethyl-ammonium acetate, tetrabutyl phosphonium methane sulfonate, and 1-butyl-4-methypyridinium hexafluorophosphate.

In an embodiment, the mixture further comprises water in an amount less than 10% relative to the amount of crude-immiscible ionic liquid in the mixture on a weight basis; the mixture may be water free.

DETAILED DESCRIPTION OF THE INVENTION

Figure 1:
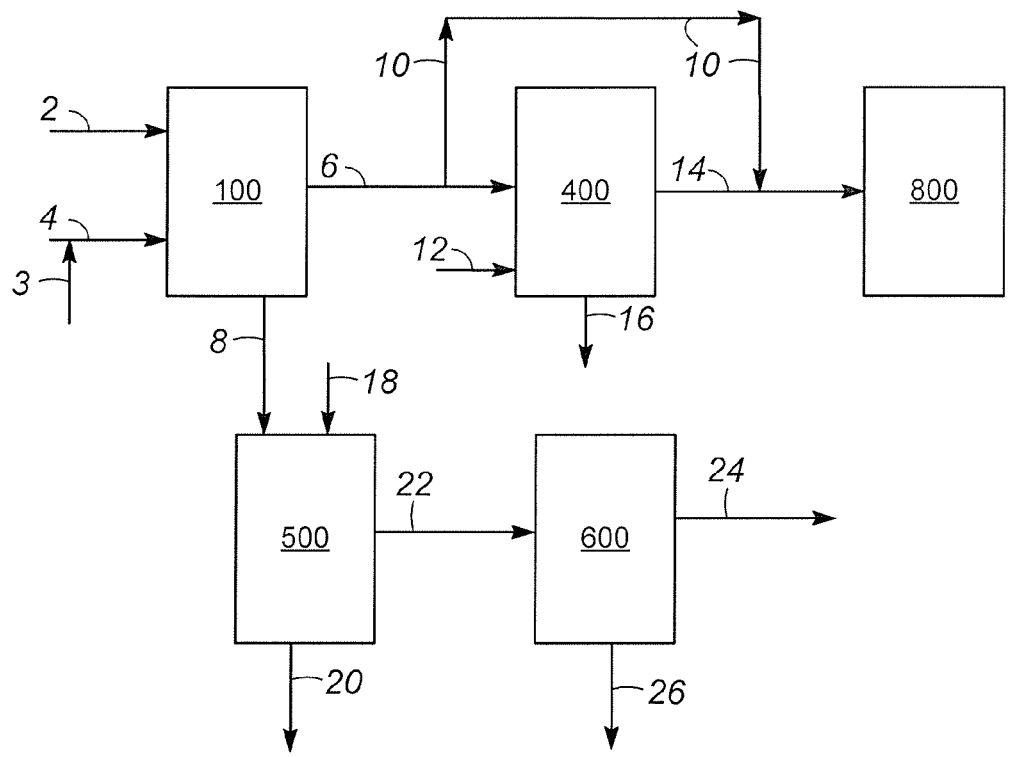
FIG. 1 is a simplified flow scheme illustrating various embodiments of the invention.

In general, the invention may be used to remove one or more metals from crude oil through use of a crude-immiscible ionic liquid. As used herein terms "crude" and "crude oil" are to be interpreted broadly to receive not only their ordinary meanings as used by those skilled in the art of producing and refining oil but also in a broad manner to include crude oil mixtures exhibiting crude-like characteristics. Thus, "crude oil" encompasses any full range crude oil produced from an oil field and any full range synthetic crude produced, for example, from tar sand, bitumen, shale oil, and coal.

In general, crude oils comprise a variety of hydrocarbon components and contain a variety of contaminants such as sulfur, nitrogen and metals. The sulfur level in the crude oil may range from about 0.1 wt % to about 5 wt %, the nitrogen level may range from about 0.01 wt % to about 3 wt %, and the total metals level may range from about 0.1 ppm-wt to about 2000 ppm-wt. The concentration of nickel may range from about 0.01 ppm-wt to about 200 ppm-wt and the concentration of vanadium may range from about 0.1 ppm-wt to about 1500 ppm-wt. In another embodiment, the sulfur level ranges from about 2 wt % to about 3 wt %, the nitrogen level ranges from about 0.1 wt % to about 0.2 wt %, and the total metals level ranges from about 20 ppm-wt to about 50 ppm-wt. The nitrogen content may be determined using ASTM method D4629-02, Trace Nitrogen in Liquid Petroleum Hydrocarbons by Syringe/Inlet Oxidative Combustion and Chemiluminescence Detection. The sulfur content may be determined using ASTM method D5453-00, Ultraviolet Fluorescence; and the metals content may be determined by UOP389-09, Trace Metals in Oils by Wet Ashing and ICP-OES. Unless otherwise noted, the analytical methods used herein such as ASTM D5453-00 and UOP389-09 are available from ASTM International, 100 Barr Harbor Drive, West Conshohocken, Pa., USA.

Processes according to the invention reduce the metal content of a crude oil. The crude may comprise a plurality of metals in various amounts. Thus, the invention removes at least a portion of at least one metal from the crude. The invention may remove the same or different amounts of each type of metal, and some metals may not be removed. In an embodiment, the metal comprises at least one of an alkali metal, an alkaline earth metal, a first transition metal, aluminum, tin, lead, and antimony. In another embodiment, the metal comprises at least one first transition metal and the metal may comprise at least one of nickel and vanadium. In a further embodiment, the metal is selected from the group consisting of an alkali metal, an alkaline earth metal, a first transition metal, aluminum, tin, lead, antimony, and combinations thereof. The metal may be selected from the group consisting of nickel, vanadium, and combinations thereof.

In an embodiment, a metal content of the crude is reduced by at least about 3% on an elemental basis. The invention may remove at least about 10% of a metal from the crude on an elemental basis; and the invention may remove at least about 30% of a metal from the crude on an elemental basis. In another embodiment, an individual metal of the crude is reduced by at least about 1% on an elemental basis in a single metal removal step. An individual metal of the crude may be reduced by at least about 10 wt % on an elemental basis in a single metal removal step; and an individual metal of the crude may be reduced by at least about 20 wt % on an elemental basis in a single metal removal step. In a further embodiment, the invention removes at least about 10% of the nickel and vanadium from the crude on a combined weight basis. For example, the invention removes 10% of the nickel and vanadium from the crude on a combined weight basis when the crude feed contains 10 ppm-wt nickel and 20 ppm-wt vanadium and the crude effluent contain 8 ppm-wt nickel and 19 ppm-wt vanadium. The metal removed may be part of a hydrocarbon molecule or complexed with a hydrocarbon molecule.

One or more ionic liquids may be used to extract one or more metals from crude. Generally, ionic liquids are non-aqueous, organic salts composed of ions where the positive ion is charge balanced with negative ion. These materials have low melting points, often below 100° C., undetectable vapor pressure and good chemical and thermal stability. The cationic charge of the salt is localized over hetero atoms, such as nitrogen, phosphorous, sulfur, arsenic, boron, antimony, and aluminum, and the anions may be any inorganic, organic, or organometallic species.

Ionic liquids suitable for use in the instant invention are crude-immiscible ionic liquids. As used herein the term "crude-immiscible ionic liquid" means the ionic liquid is capable of forming a separate phase from crude under operating conditions of the process. Ionic liquids that are miscible with crude at the process conditions will be completely soluble with the crude; therefore, no phase separation would be feasible. Thus, crude-immiscible ionic liquids may be insoluble with or partially soluble with crude under operating conditions. An ionic liquid capable of forming a separate phase from the crude under the operating conditions is considered to be crude-immiscible. Ionic liquids according to the invention may be insoluble, partially soluble, or completely soluble (miscible) with water.

In an embodiment, the crude-immiscible ionic liquid comprises at least one of an imidazolium ionic liquid, an ammonium ionic liquid, a pyridinium ionic liquid, and a phosphonium ionic liquid; the crude-immiscible ionic liquid may comprise at least one of an imidazolium ionic liquid, a pyridinium ionic liquid, and a phosphonium ionic liquid. In another embodiment, the crude-immiscible ionic liquid is selected from the group consisting of imidazolium ionic liquids, ammonium ionic liquids, pyridinium ionic liquids, phosphonium ionic liquids, and combinations thereof; the crude-immiscible ionic liquid may be selected from the group consisting of imidazolium ionic liquids, pyridinium ionic liquids, phosphonium ionic liquids, and combinations thereof. Imidazolium, pyridinium, and ammonium ionic liquids have a cation comprising at least one nitrogen atom. Phosphonium ionic liquids have a cation comprising at least one phosphorus atom.

In an embodiment, the crude-immiscible ionic liquid comprises at least one of 1-ethyl-3-methylimidazolium ethyl sulfate, 1-butyl-3-methylimidazolium hydrogen sulfate, 1-ethyl-3-methylimidazolium chloride, 1-ethyl-3-methylimidazolium bis(trifluoromethylsulfonyl)imide, 1-butyl-3-methylimidazolium hexafluorophosphate, 1-butyl-3-methylimidazolium tetrafluoroborate, tetraethyl-ammonium acetate, tetrabutylphosphonium methanesulfonate, and 1-butyl-4-methypyridinium hexafluorophosphate. The crude-immiscible ionic liquid may be selected from the group consisting of 1-ethyl-3-methylimidazolium ethyl sulfate, 1-butyl-3-methylimidazolium hydrogen sulfate, 1-ethyl-3-methylimidazolium chloride, 1-ethyl-3-methylimidazolium bis(trifluoromethylsulfonyl)imide, 1-butyl-3-methylimidazolium hexafluorophosphate, 1-butyl-3-methylimidazolium tetrafluoroborate, tetraethyl-ammonium acetate, tetrabutylphosphonium methanesulfonate, 1-butyl-4-methypyridinium hexafluorophosphate, and combinations thereof.

In an embodiment, the invention is a process for removing a metal from crude oil comprising a contacting step and a separating step. In the contacting step, the crude oil comprising the metal and a crude-immiscible ionic liquid are contacted or mixed. The contacting may facilitate transfer or extraction of the one or more metals from the crude oil to the ionic liquid. Although a crude-immiscible ionic liquid that is partially soluble in crude oil may facilitate transfer of the metal from the crude oil to the ionic liquid, partial solubility is not required. Insoluble crude oil/crude-immiscible ionic liquid mixtures may have sufficient interfacial surface area between the crude oil and ionic liquid to be useful. In the separation step, the mixture of crude oil and crude-immiscible ionic liquid settles or forms two phases, a crude oil phase and a crude-immiscible ionic liquid phase, which are separated to produce a crude-immiscible ionic liquid effluent comprising the metal and a crude oil effluent.

In an embodiment, a de-emulsifier is added to the contacting step and/or the separation step to facilitate or enable the phase separation of the crude oil and the crude-immiscible ionic liquid, for example, when contacting or mixing the crude oil and crude-immiscible ionic liquid forms or would otherwise form an emulsion. In an embodiment, the de-emulsifier is added to the contacting step simultaneously with the crude oil and/or crude-immiscible ionic liquid. The optional de-emulsifier addition step may be used after an emulsion has formed.

De-emulsifiers suitable for use in the invention are any ethoxylated and/or propoxylated polyamines, di-epoxides or polyols. Examples of such de-emulsifiers include alcohol-based de-emulsifiers available from Baker Petrolite Corporation such as BPR23025 and BPR27330. In an embodiment, the weight ratio de-emulsifier to crude oil feed ranges from about 1:10,000 to about 1:1000. In another embodiment, the weight ratio of de-emulsifier to crude oil feed ranges from about 1:1000 to about 1:10.

Processes of the invention may be conducted in various equipment which are well known in the art and are suitable for batch or continuous operation. For example, in a small scale form of the invention, the crude oil, crude-immiscible ionic liquid, and optionally, a de-emulsifier may be mixed in a beaker, flask, or other vessel, e.g. by stirring, shaking, use of a mixer, or a magnetic stirrer. The mixing or agitation is stopped and the mixture forms a crude oil phase and a crude-immiscible ionic liquid phase after settling. In an embodiment, the mixture is centrifuged to facilitate formation of the two phases. The phases can be separated, for example, by decanting or use of a pipette to produce a crude oil effluent having a lower metal content relative to the crude oil introduced to the process. The process also produces a crude-immiscible ionic liquid effluent comprising the one or more metals.

The contacting and separating steps may be repeated for example when the metal content of the crude oil effluent is to be reduced further to obtain a desired metal content in the ultimate crude oil product stream from the process. Each set, group, or pair of contacting and separating steps may be referred to as a metal removal step. Thus, the invention encompasses processes having single and multiple metal removal steps. A metal removal zone may be used to perform a metal removal step. As used herein, the term "zone" can refer to one or more equipment items and/or one or more sub-zones. Equipment items may include, for example, one or more vessels, heaters, separators, exchangers, conduits, pumps, compressors, and controllers. Additionally, an equipment item can further include one or more zones or sub-zones. The metal removal process or step may be conducted in a similar manner and with similar equipment as is used to conduct other liquid-liquid wash and extraction operations. Suitable equipment includes, for example, columns with: trays, packing, rotating discs or plates, and static mixers. Pulse columns and mixing/settling tanks may also be used.

Figure 2A:
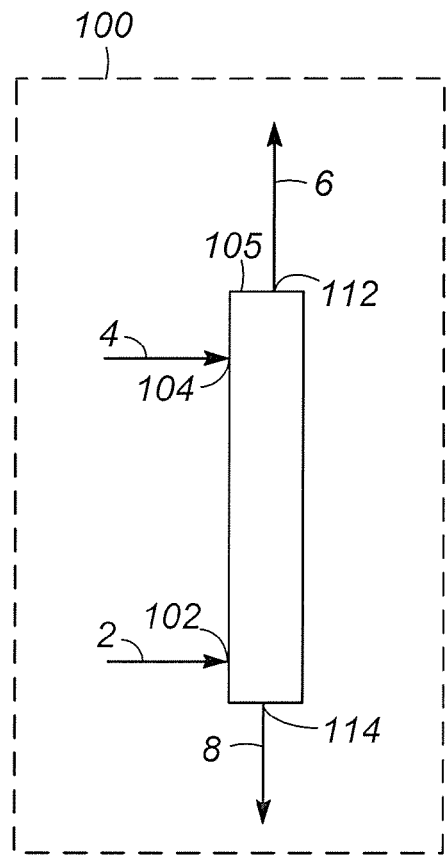
FIGS. 2A and 2B are simplified flow schemes illustrating different embodiments of an extraction zone of the invention.

FIG. 2A illustrates an embodiment of the invention which may be practiced in metal removal zone 100 that comprises a multi-stage, counter-current extraction column 105 wherein the crude oil and the crude-immiscible ionic liquid are contacted and separated. Crude oil feed stream 2 enters extraction column 105 through crude oil feed inlet 102 and lean ionic liquid stream 4 enters extraction column 105 through ionic liquid inlet 104. In the Figures, reference numerals of the streams and the lines or conduits in which they flow are the same. Crude oil feed inlet 102 is located below ionic liquid inlet 104. The crude oil effluent passes through crude oil effluent outlet 112 in an upper portion of extraction column 105 to crude oil effluent conduit 6. The ionic liquid effluent including the metal removed from the crude oil feed passes through ionic liquid effluent outlet 114 in a lower portion of extraction column 105 to ionic liquid effluent conduit 8. The optional de-emulsifier may be included in either one or both of crude oil feed stream 2 and lean ionic liquid stream 4. In another embodiment, the de-emulsifier is added to extraction column 105 by a separate conduit not shown.

Consistent with common terms of art, the ionic liquid introduced to the metal removal step may be referred to as a "lean ionic liquid" generally meaning a crude-immiscible ionic liquid that is not saturated with one or more extracted metals. Lean ionic liquid may include one or both of fresh and regenerated ionic liquid and is suitable for accepting or extracting metal from the crude oil feed. Likewise, the ionic liquid effluent may be referred to as "rich ionic liquid", which generally means an ionic liquid effluent produced by a metal removal step or process or otherwise including a greater amount of extracted metals than the amount of extracted metals included in the lean ionic liquid. A rich ionic liquid may require regeneration or dilution, e.g. with fresh ionic liquid, before recycling the rich ionic liquid to the same or another metal removal step of the process.

Figure 2B:
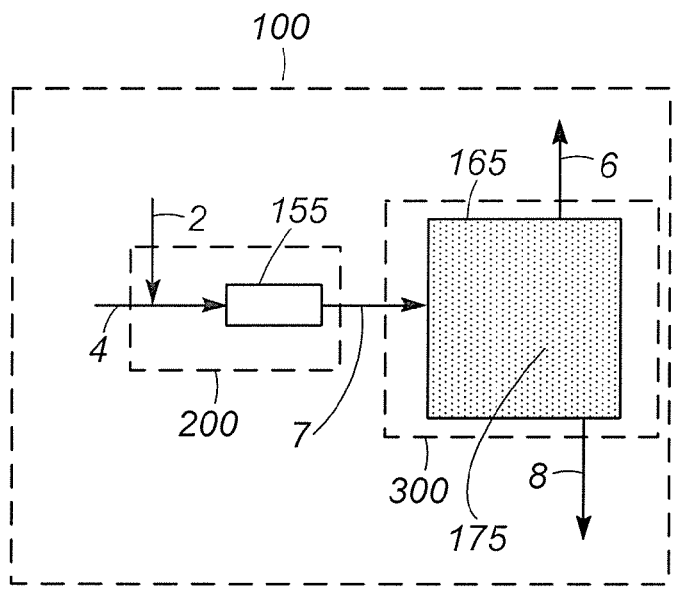

FIG. 2B illustrates another embodiment of metal removal zone 100 that comprises a contacting zone 200 and a separation zone 300. In this embodiment, lean ionic liquid stream 4 and crude oil feed stream 2 are introduced into the contacting zone 200 and mixed by introducing crude oil feed stream 2 into the flowing lean ionic liquid stream 4 and passing the combined streams through static in-line mixer 155. Static in-line mixers are well known in the art and may include a conduit with fixed internals such as baffles, fins, and channels that mix the fluid as it flows through the conduit. In other embodiments, not illustrated, lean ionic liquid stream 4 may be introduced into crude oil feed stream 2, or the lean ionic liquid stream 4 and crude oil feed stream may be combined such as through a "Y" conduit. In another embodiment, lean ionic liquid stream 4 and crude oil feed stream 2 are separately introduced into the static in-line mixer 155. In other embodiments, the streams may be mixed by any method well known in the art including stirred tank and blending operations. The mixture comprising crude oil and ionic liquid is transferred to separation zone 300 via transfer conduit 7. Separation zone 300 comprises separation vessel 165 wherein the two phases are allowed to separate into a rich ionic liquid phase which is withdrawn from a lower portion of separation vessel 165 via ionic liquid effluent conduit 8 and the crude oil phase is withdrawn from an upper portion of separation vessel 165 via crude oil effluent conduit 6. Separation vessel 165 may comprise a boot, not illustrated, from which rich ionic liquid is withdrawn via conduit 8. In an embodiment, a de-emulsifier may be included in either one or both of crude oil feed stream 2 and lean ionic liquid stream 4. In another embodiment, a de-emulsifier is added to contacting zone 200 by a separate conduit not shown. In yet another embodiment, a de-emulsifier is added to the separation zone 300 or transfer conduit 7 by a conduit not shown.

Separation vessel 165 may contain a solid media 175 and/or other coalescing devices which facilitate the phase separation. In other embodiments the separation zone 300 may comprise multiple vessels which may be arranged in series, parallel, or a combination thereof. The separation vessels may be of any shape and configuration to facilitate the separation, collection, and removal of the two phases. In a further embodiment not illustrated, metal removal zone 100 may include a single vessel wherein lean ionic liquid stream 4 and crude oil feed stream 2 are mixed, then remain in the vessel to settle into the crude oil effluent and rich ionic liquid phases. In an embodiment the process comprises at least two metal removal steps. For example, the crude oil effluent from one metal removal step may be passed directly as the crude oil feed to a second metal removal step. In another embodiment, the crude oil effluent from one metal removal step may be treated or processed before being introduced as the crude oil feed to the second metal removal step. There is no requirement that each metal removal zone comprises the same type of equipment. Different equipment and conditions may be used in different metal removal zones.

The metal removal step may be conducted under metal removal conditions including temperatures and pressures sufficient to keep the crude-immiscible ionic liquid and crude oil feeds and effluents as liquids. For example, the metal removal step temperature may range between about 10° C. and less than the decomposition temperature of the ionic liquid and the pressure may range between about atmospheric pressure and about 700 kPa(g). When the crude-immiscible ionic liquid comprises more than one ionic liquid component, the decomposition temperature of the ionic liquid is the lowest temperature at which any of the ionic liquid components decompose. The metal removal step may be conducted at a uniform temperature and pressure or the contacting and separating steps of the metal removal step may be operated at different temperatures and/or pressures. In an embodiment, the contacting step is conducted at a first temperature, and the separating step is conducted at a temperature at least 5° C. lower than the first temperature. In a non limiting example the first temperature is at least about 50° C. and the separation temperature is about 25° C. Such temperature differences may facilitate separation of the crude oil and ionic liquid phases.

The above and other metal removal step conditions such as the contacting or mixing time, the separation or settling time, and the ratio of crude-immiscible ionic liquid (lean ionic liquid) to crude oil feed may vary greatly based, for example, on the nature of the crude oil feed, the metal content of the crude oil feed, the degree of metal removal required, the number of metal removal steps employed, and the specific equipment used. In general it is expected that contacting time may range from less than one minute to about two hours; settling time may range from about one minute to about eight hours; and the weight ratio of crude oil feed to lean ionic liquid may range from about 1:1,000 to about 1,000:1. In an embodiment, the weight ratio of crude oil feed to lean ionic liquid ranges from about 1:100 to about 100:1; and the weight ratio of crude oil feed to lean ionic liquid may range from about 1:10 to about 10:1. In an embodiment the weight of crude oil feed is greater than the weight of ionic liquid. The degree of phase separation between the crude oil and ionic liquid phases is another factor to consider as it affects recovery of the ionic liquid and crude. The degree of metal removed and the recovery of the crude and ionic liquids may be affected differently by the nature of the crude feed, the de-emulsifier, if used, the specific ionic liquid or liquids, the equipment, and the metal removal conditions such as those discussed above.

The amount of water present in the crude oil/crude-immiscible ionic liquid mixture during the metal removal step may also affect the amount of metal removed and/or the degree of phase separation or recovery of the crude and ionic liquid. In an embodiment, the crude oil/crude-immiscible ionic liquid mixture has a water content of less than about 10% relative to the weight of the ionic liquid. In another embodiment, the water content of the crude oil/crude-immiscible ionic liquid mixture is less than about 5% relative to the weight of the ionic liquid; and the water content of the crude oil/crude-immiscible ionic liquid mixture may be less than about 2% relative to the weight of the ionic liquid. In a further embodiment, the crude oil/crude-immiscible ionic liquid mixture is water free, i.e. the mixture does not contain water.

FIG. 1 is a flow scheme illustrating various embodiments of the invention and some of the optional and/or alternate steps and apparatus encompassed by the invention. Crude oil stream 2 and the crude-immiscible ionic liquid stream 4 are introduced to and contacted and separated in metal removal zone 100 to produce ionic liquid effluent stream 8 and crude oil effluent stream 6 as described above. The ionic liquid stream 4 may be comprised of fresh ionic liquid stream 3 and/or an ionic liquid stream which may be recycled in the process as described below. The optional de-emulsifier may be added to metal removal zone 100 in any convenient manner such as those discussed above to enable or facilitate the phase separation. In an embodiment, a portion or all of crude oil effluent stream 6 is passed via conduit 10 to a crude oil distillation zone 800.

An optional crude oil washing step may be used, for example, to recover ionic liquid that is entrained or otherwise remains in the crude oil effluent stream by using water to wash or extract the ionic liquid from the crude oil effluent. In this embodiment, a portion or all of crude oil effluent stream 6 (as feed) and a water stream 12 (as solvent) are introduced to crude oil washing zone 400. The crude oil effluent and water streams introduced to crude oil washing zone 400 are mixed and separated to produce a washed crude oil stream 14 and a spent water stream 16, which comprises the ionic liquid. The crude oil washing step may be conducted in a similar manner and with similar equipment as used to conduct other liquid-liquid wash and extraction operations as discussed above. Various crude oil washing step equipment and conditions such as temperature, pressure, times, and solvent to feed ratio may be the same as or different from the metal removal zone equipment and conditions. In general, the crude oil washing step conditions will fall within the same ranges as given above for the metal removal step conditions. A portion or all of the washed crude oil stream 14 may be passed to crude oil distillation zone 800.

An optional ionic liquid regeneration step may be used, for example, to regenerate the ionic liquid by removing the metal from the ionic liquid, i.e. reducing the metal content of the rich ionic liquid. In an embodiment, a portion or all of ionic liquid effluent stream 8 (as feed) comprising the crude-immiscible ionic liquid and the metal and a regeneration solvent stream 18 are introduced to ionic liquid regeneration zone 500. The crude-immiscible ionic liquid effluent and regeneration solvent streams are mixed and separated to produce an extract stream 20 comprising the metal, and a regenerated ionic liquid stream 22. The ionic liquid regeneration step may be conducted in a similar manner and with similar equipment as used to conduct other liquid-liquid wash and extraction operations as discussed above. Various ionic liquid regeneration step conditions such as temperature, pressure, times, and solvent to feed may be the same as or different from the metal removal conditions. In general, the ionic liquid regeneration step conditions will fall within the same ranges as given above for the metal removal step conditions.

In an embodiment, the regeneration solvent stream 18 comprises a hydrocarbon fraction lighter than the crude oil stream 2 and which is immiscible with the crude-immiscible ionic liquid. The lighter hydrocarbon fraction may consist of a single hydrocarbon compound or may comprise a mixture of hydrocarbons. In an embodiment, the lighter hydrocarbon fraction comprises at least one of a naphtha, gasoline, diesel, light cycle oil (LCO), and light coker gas oil (LCGO) hydrocarbon fraction. The lighter hydrocarbon fraction may comprise straight run fractions and/or products from conversion processes such as hydrocracking, hydrotreating, fluid catalytic cracking (FCC), reforming, coking, and visbreaking In this embodiment, extract stream 20 comprises the lighter hydrocarbon regeneration solvent and the metal. In another embodiment, the regeneration solvent stream 18 comprises water and the ionic liquid regeneration step produces extract stream 20 comprising the metal and regenerated ionic liquid 22 comprising water and the crude-immiscible ionic liquid. In an embodiment wherein regeneration solvent stream 18 comprises water, a portion or all of spent water stream 16 may provide a portion or all of regeneration solvent stream 18. Regardless of whether regeneration solvent stream 18 comprises a lighter hydrocarbon fraction or water, a portion or all of regenerated ionic liquid stream 22 may be recycled to the metal removal step via a conduit not shown consistent with other operating conditions of the process. For example, a constraint on the water content of the crude-immiscible ionic liquid stream 4 or ionic liquid/crude mixture in metal removal zone 100 may be met by controlling the proportion and water content of fresh and recycled ionic liquid streams.

Optional ionic liquid drying step is illustrated by drying zone 600. The ionic liquid drying step may be employed to reduce the water content of one or more of the streams comprising ionic liquid to control the water content of the metal removal step as described above. In the embodiment of FIG. 1, a portion or all of regenerated ionic liquid stream 22 is introduced to drying zone 600. Although not shown, other streams comprising ionic liquid such as the fresh ionic liquid stream 3, crude-immiscible ionic liquid effluent stream 8, and spent water stream 16, may also be dried in any combination in drying zone 600. To dry the ionic liquid stream or streams, water may be removed by one or more various well known methods including distillation, flash distillation, and using a dry inert gas to strip water. Generally, the drying temperature may range from about 100° C. to less than the decomposition temperature of the ionic liquid, usually less than about 300° C. The pressure may range from about 35 kPa(g) to about 250 kPa(g). The drying step produces a dried ionic liquid stream 24 and a drying zone water effluent stream 26. Although not illustrated, a portion or all of dried ionic liquid stream 24 may be recycled or passed to provide all or a portion of the crude-immiscible ionic liquid 4 introduced to metal removal zone 100. A portion or all of drying zone water effluent stream 26 may be recycled or passed to provide all or a portion of the water introduced into crude washing zone 400 and/or ionic liquid regeneration zone 500.

Unless otherwise stated, the exact connection point of various inlet and effluent streams within the zones is not essential to the invention. For example, it is well known in the art that a stream to a distillation zone may be sent directly to the column, or the stream may first be sent to other equipment within the zone such as heat exchangers, to adjust temperature, and/or pumps to adjust the pressure. Likewise, streams entering and leaving washing or extraction zones including metal removal zone 100, crude oil washing zone 400, and ionic liquid regeneration zone 500 may pass through ancillary equipment such as heat exchanges within the zones. Streams, including recycle streams, introduced to washing or extraction zones may be introduced individually or combined prior to or within such zones.

The invention encompasses a variety of flow scheme embodiments including optional destinations of streams, splitting streams to send the same composition, i.e. aliquot portions, to more than one destination, and recycling various streams within the process. Examples include: various streams comprising ionic liquid and water may be dried and/or passed to other zones to provide all or a portion of the water and/or ionic liquid required by the destination zone. The various process steps may be operated continuously and/or intermittently as needed for a given embodiment, e.g., based on the quantities and properties of the streams to be processed in such steps. As discussed above the invention encompasses multiple metal removal steps, which may be performed in parallel, sequentially, or a combination thereof. Multiple metal removal steps may be performed within the same metal removal zone and/or multiple metal removal zones may be employed with or without intervening washing, regeneration and/or drying zones.

EXAMPLES

The examples are presented to further illustrate some aspects and benefits of the invention and are not to be considered as limiting the scope of the invention.

Example 1

A commercial sample of a Medium Arabian Crude Oil having the following properties was obtained for use as the crude oil feed stream: 2.88 wt % sulfur, 1000 ppm-wt nitrogen, 128 ppm-wt water, Total Acid Number of 0.116 mg KOH/g, 20.4 ppm-wt vanadium, and 9.5 ppm-wt nickel. The Total Acid Number was determined by ASTM Method D-0664, Acid Number of Petroleum Products by Potentiometric Titration. The water content was determined by ASTM Method D1364-02, Karl Fisher Reagent Titration. The nitrogen content was determined by ASTM Method D4629-02, Trace Nitrogen in Liquid Petroleum Hydrocarbons by Syringe/Inlet Oxidative Combustion and Chemiluminescence Detection. The sulfur content was determined by ASTM Method D5453-00, Ultraviolet Fluorescence. The metals content was determined by UOP389-09, Trace Metals in Oils by Wet Ashing and ICP-OES.

Examples 2-10

The Medium Arabian Crude Oil of Example 1, the ionic liquid listed in Table 1, and a de-emulsifier containing butanol (BPR 27330 from Baker Petrolite Corporation) in a weight ratio of Medium Arabian Crude Oil to ionic liquid to de-emulsifier of 1:0.5:0.05 were mixed for two hours at the temperature given in Table 1 using a digital magnetic stirrer hot plate. The mixtures were then centrifuged for 5 minutes at 25° C. and a sample of the crude oil phase (crude oil effluent) was removed with a pipette and analyzed by for metals using UOP389-09. The results are compared in Table 1 where the amounts of metal removed from the crude oil are reported as a percentage on an elemental basis. A result of zero ("0") means none of that metal was removed.

TABLE 1

| Example | Ionic Liquid (IL) | Mixing Temperature ° C. | Nickel removed, % | Vanadium removed, % |
|---|---|---|---|---|
| 2 | 1-ethyl-3-methylimidazolium ethyl sulfate | 50 | 7.4 | 0 |
| 3 | 1-butyl-3-methylimidazolium hydrogen sulfate | 50 | 2.1 | 0 |
| 4 | 1-ethyl-3-methylimidazolium chloride | 50 | 10.0 | 0 |

TABLE 1-continued

| Example | Ionic Liquid (IL) | Mixing Temperature ° C. | Nickel removed, % | Vanadium removed, % |
|---|---|---|---|---|
| 5 | 1-ethyl-3-methylimidazolium bis(trifluoromethylsulfonyl)imide | 50 | 24.2 | 7.3 |
| 6 | 1-butyl-3-methylimidazolium hexafluorophosphate | 50 | 10.0 | 0 |
| 7 | 1-butyl-3-methylimidazolium tetrafluoroborate | 50 | 8.4 | 0 |
| 8 | tetraethyl-ammonium acetate | 70 | 1.0 | 0 |
| 9 | tetrabutylphosphonium methanesulfonate | 70 | 13.7 | 11.8 |
| 10 | 1-butyl-4-methypyridinium hexafluorophosphate | 70 | 13.7 | 16.7 |

Examples 2-10 illustrate that a crude-immiscible ionic liquid comprising at least one of an imidazolium ionic liquid, an ammonium ionic liquid, a pyridinium ionic liquid, and a phosphonium ionic liquid removes metal, e.g. at least one of vanadium and nickel from crude oil. The results also demonstrate the unpredictable nature of this art as the results vary significantly between the metals, between the groups of ionic liquids, and even within a group of similar ionic liquids.

The invention claimed is:

1. A process for removing a metal from a crude oil comprising:
    (a) contacting the crude oil comprising the metal with a crude-immiscible ionic liquid to produce a mixture comprising the crude oil and the crude-immiscible ionic liquid, the crude-immiscible ionic liquid comprising at least one of an imidazolium ionic liquid, an ammonium ionic liquid, a pyridinium ionic liquid, and a phosphonium ionic liquid;
    (b) separating the mixture to produce a crude oil effluent and a crude-immiscible ionic liquid effluent, the crude-immiscible ionic liquid effluent comprising the metal; and
    (c) optionally adding a de-emulsifier to at least one of the contacting step (a) and the separating step (b);
    wherein the crude-immiscible ionic liquid comprises at least one of 1-ethyl-3-methylimidazolium ethyl sulfate, 1-butyl-3-methylimidazolium hydrogen sulfate, 1-ethyl-3-methylimidazolium chloride, 1-ethyl-3-methylimidazolium bis(trifluoromethylsulfonyl)imide, 1-butyl-3-methylimidazolium hexafluorophosphate, 1-butyl-3-methylimidazolium tetrafluoroborate, tetraethyl-ammonium acetate, tetrabutylphosphonium methanesulfonate, and 1-butyl-4-methypyridinium hexafluorophosphate; and
    wherein the metal content of the crude oil is reduced by at least 1-30% on an elemental basis further comprising contacting the ionic liquid effluent with a regeneration solvent and separating the ionic liquid effluent from the regeneration solvent to produce an extract stream comprising the metal and a regenerated ionic liquid stream comprising the crude-immiscible ionic liquid wherein the crude oil effluent comprises the crude-immiscible ionic liquid, the process further comprising washing at least a portion of the crude oil effluent with water to produce a washed crude oil effluent and a spent water stream, the spent water stream comprising the crude-immiscible ionic liquid; wherein at least a portion of the spent water stream is at least a portion of the regeneration solvent wherein the regeneration solvent comprises water and the regenerated ionic liquid stream further comprises water.

2. The process of claim 1 further comprising drying at least a portion of at least one of the regenerated ionic liquid stream, and the spent water stream to produce a dried ionic liquid stream.

3. The process of claim 2 further comprising recycling at least a portion of the dried ionic liquid stream to the contacting step.

4. A process for removing a metal from a crude oil comprising:
    (a) contacting the crude oil comprising the metal with a crude-immiscible ionic liquid to produce a mixture comprising the crude oil and the crude-immiscible ionic liquid, the crude-immiscible ionic liquid comprising at least one of an imidazolium ionic liquid, an ammonium ionic liquid, a pyridinium ionic liquid, and a phosphonium ionic liquid;
    (b) separating the mixture to produce a crude oil effluent and a crude-immiscible ionic liquid effluent, the crude-immiscible ionic liquid effluent comprising the metal;
    (c) optionally adding a de-emulsifier to at least one of the contacting step (a) and the separating step (b); and
    at least one of:
    (d) washing at least a portion of the crude oil effluent with water to produce a washed crude oil stream and a spent water stream;
    (e) contacting the ionic liquid effluent with a regeneration solvent and separating the ionic liquid effluent from the regeneration solvent to produce an extract stream comprising the metal and a regenerated ionic liquid stream; and
    (f) drying at least a portion of at least one of the ionic liquid effluent, the spent water stream, and the regenerated ionic liquid stream to produce a dried ionic liquid stream.

5. The process of claim 4 further comprising recycling at least a portion of at least one of the ionic liquid effluent, the spent water stream, the regenerated ionic liquid stream, and the dried ionic liquid stream to the contacting step.

* * * * *